United States Patent
Kelders et al.

[11] Patent Number: 6,135,275
[45] Date of Patent: Oct. 24, 2000

[54] TWO COMPONENT MIXING CONTAINERS

[75] Inventors: Jan Kelders, Drunen, Netherlands; Tilwin Lepsius, Duesseldorf, Germany; Erwin Boes, Helmond, Netherlands

[73] Assignee: Henkel Kommanditgesellschaft auf Aktien, Duesseldorf, Germany

[21] Appl. No.: 09/202,113

[22] PCT Filed: Aug. 27, 1997

[86] PCT No.: PCT/EP97/04659

§ 371 Date: Aug. 9, 1999

§ 102(e) Date: Aug. 9, 1999

[87] PCT Pub. No.: WO98/09886

PCT Pub. Date: Mar. 12, 1998

[30] Foreign Application Priority Data

Sep. 4, 1996 [DE] Germany ............... 196 35 833

[51] Int. Cl.⁷ .................................................. B65D 25/08
[52] U.S. Cl. ..................... 206/221; 206/219; 215/DIG. 8
[58] Field of Search ................................. 206/219, 221, 206/222; 215/DIG. 93; 222/80, 83

[56] References Cited

U.S. PATENT DOCUMENTS

| | | |
|---|---|---|
| 3,410,444 | 11/1968 | Morane ................................ 206/221 |
| 4,024,952 | 5/1977 | Leitz ................................... 206/221 |
| 4,203,517 | 5/1980 | Hildebrandt et al. ................ 206/221 |
| 4,465,183 | 8/1984 | Saito et al. ........................... 206/222 |
| 4,693,366 | 9/1987 | Goncalves ............................ 206/222 |
| 4,757,916 | 7/1988 | Goncalves ............................. 222/83 |
| 5,170,888 | 12/1992 | Goncalves . |
| 5,277,303 | 1/1994 | Goyet et al. . |
| 5,647,481 | 7/1997 | Hundertmante et al. ............ 206/219 |

FOREIGN PATENT DOCUMENTS

| | | |
|---|---|---|
| 0 475 789 | 3/1992 | European Pat. Off. . |
| 0 528 707 | 2/1993 | European Pat. Off. . |
| 2 569 666 | 7/1986 | France . |
| 2 707 601 | 1/1995 | France . |
| 44 36 863 | 1/1996 | Germany . |

*Primary Examiner*—Bryon P. Gehman
*Attorney, Agent, or Firm*—Wayne C. Jaeschke; Glenn E.J. Murphy; Kenneth Watov

[57] ABSTRACT

A container system includes two closable containers for containing two substances, respectively, whereby the closable containers are joined together in their closed form with their respective closures facing each other. By moving the joined containers relative to one another, the closures between the containers can be opened in such a way that their contents can be brought together and mixed. After mixing, the mixture can then be dispensed from one of the containers.

29 Claims, 5 Drawing Sheets

TWO COMPONENT MIXING CONTAINERS

BACKGROUND

1. Field of the Invention

This invention relates generally to a container system for accommodating at least two substances held separately in closable containers, and more particularly to such a system comprising at least two containers with closures connected to one another in a manner permitting a user to selectively open the closures for combining the two substances together another in such a way that the container volumes are connected together, and to a method for combining at least two substances held separately in predetermined quantities in closed containers of a container system, the at least two containers with an intermediate closure disposed in between and closures facing one another being connected to one another and the connected containers being opened by movement relative to one another so that the at least two substances can be combined.

2. Discussion of Related Art

There are many known multicomponent systems which are only supposed to be combined immediately before use so that the reaction initiated by their combination does not take place beforehand. It is also known that, in many cases, such multicomponent systems only function properly when the individual components are dispensed in certain ratios to one another.

There are various known double compartment systems in which two-component substances are stored separately in closed form and, in order to combine the substances, the container closures are opened before use by destruction, for example by cutting open or by piercing the closure material. DE 44 36 863 relates to a double compartment system in which the containers are closed by firmly wedged stoppers which are mutually forced from their closed position by being turned relative to one another, thereby opening connecting passages between the containers. However, this has the disadvantage that the container openings are seriously constricted and the substances to be combined are impeded by, and adhere partly to, the constrictions between the containers and their openings.

SUMMARY OF THE INVENTION

An object of the invention is to provide an inexpensive container system for containing at least two substances in separate but joined respective containers, which after opening of the closures between the containers, the resultant openings permit free passage of the substances between the containers for mixing the substances together for later dispensing from one of the containers.

The technical problem addressed by the present invention was to provide an inexpensive container system in which, after opening of the closures, the container openings would be very largely free and which would be reusable, and a method by which this problem could be solved in a simple uncomplicated manner.

With the problems of the prior art in mind, in one embodiment of the invention, the joined containers include screw closures, whereby the closures between the containers can each be opened and closed by screw connection means which turn in opposite directions between adjacent containers.

According to the invention, this problem has been solved by designing a container of the type defined at the beginning in such a way that the closures are screw closures and one of the containers is designed to be closed by a combination of closure and intermediate closure and by a method in which the two containers can each be opened and closed by screw connections which turn in opposite directions.

A container system such as this has the advantage that the respective containers can be filled with the individual substances—as components of a multicomponent system—in the correct amounts and closed by the manufacturer. The containers thus prepared can be connected to form a system in which the individual substances are present in the correct respective proportions and can never be confused. Just before use, the containers connected in the system need only be moved relative to one another to be opened in such a way that the container volumes are connected to one another without the container openings being seriously constricted or troublesome closure elements impeding the substances flowing together. The substances held therein can thus be fully combined and mixed without any interference. Through the use of screw closures, the container system is basically suitable for re-use.

If two containers joined to form a system with closures facing one another and screw closures turning in opposite directions are connected to one another in an embodiment of the invention, they can advantageously be opened by turning in the same direction. This advantage, in another embodiment, can also be obtained in a system where an intermediate closure is additionally disposed between two containers. In one particularly advantageous embodiment, the intermediate closure with at least one screwthread, together with a screw closure turning in the same direction, serves as a closure to one container while the other container with an external screwthread turning in the same direction is designed to be screwed into the intermediate closure and to be closed by a screw closure turning in the opposite direction.

If, when the two containers are connected, the two screw closures lock axially against one another via their outer circumferences, the axial movement of one screw closure can advantageously be transmitted to the other. One screw closure can thus still be axially moved from outside the respective container even when it has already been opened.

In special embodiments, it is possible with advantage to store more than two substances in one container system and, after connection of the containers, to combine and mix the substances of more than two-component systems by turning the containers relative to one another.

BRIEF DESCRIPTION OF THE DRAWINGS

These and other advantages of the invention are explained by the description of an example of one embodiment which is illustrated in the accompanying drawings, in which like items are identified by the same reference designation. The one embodiment in question is based on a system of two containers in which, for example, a two-component hair colorant is stored and can be activated by simply moving the co-joined two containers relative to one another. In the accompanying drawings.

DETAILED DESCRIPTION OF THE INVENTION

Figure 1:
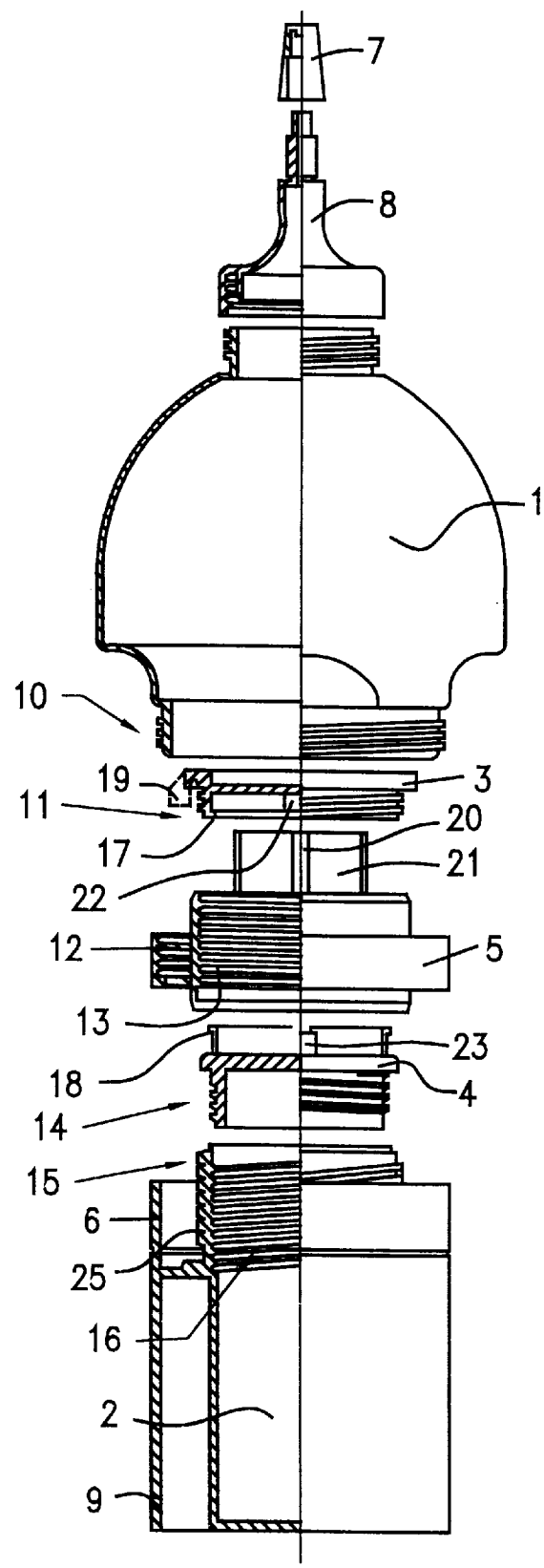
FIG. 1 is a partial sectional side elevational view of the container system broken down into its individual components.
Figure 2B:
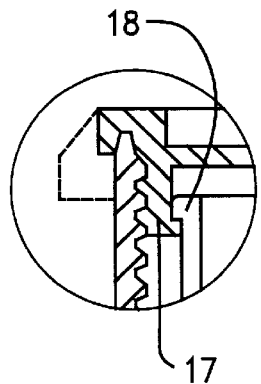
FIG. 2B show an enlarged detailed view of the area 2B of FIG. 2.

In the example of the embodiment of the invention shown in FIG. 1, the container system includes seven individual components. These are—from top to bottom—the closure cap 7, the pouring spout 8, the upper container 1, the upper closure 3, the intermediate closure 5, the lower closure 4 and the lower container 2. Shown separately on the lower container is the distance sleeve 6 which is in line with the outer wall 9 of the lower container 2 and separated therefrom by a weak spot in the form of a notch. As shown more clearly in FIG. 2, and the enlarged segment of FIG. 2A, the distance sleeve 6, by bearing against the intermediate closure 5, maintains the required distance between the upper container 1 and the lower container 2 as long as they are interconnected in closed form. As will be explained in detail hereinafter, the outer wall 9 acts primarily as a grip for the reciprocal turning from lower to upper container.

Figure 2:
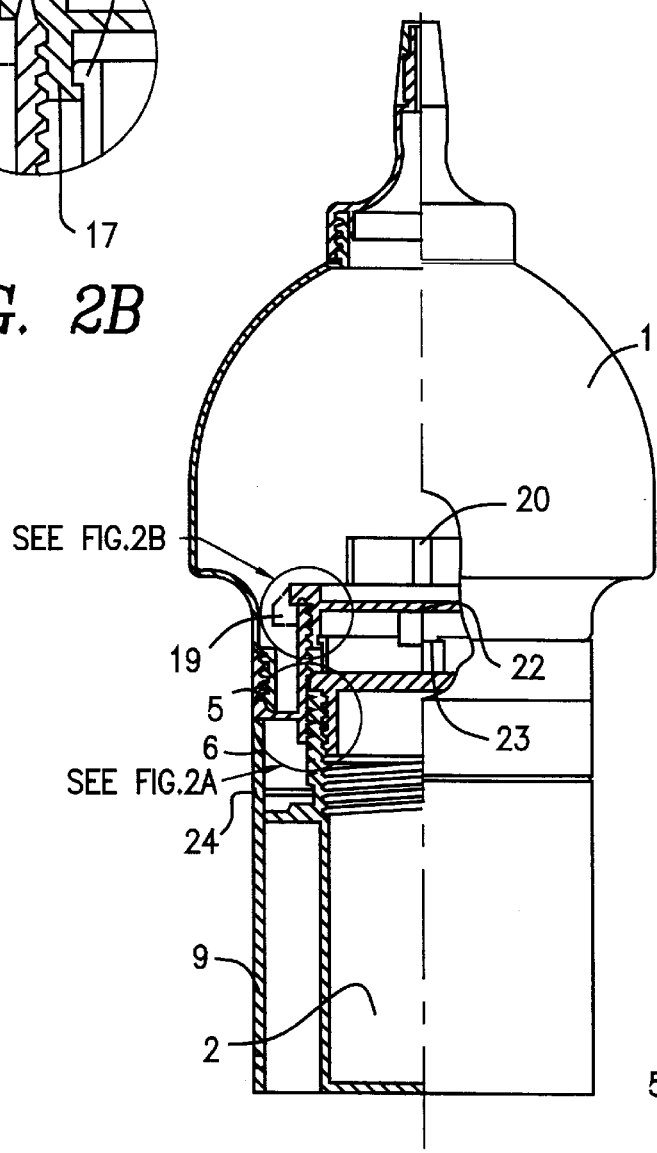
FIG. 2 is a partial sectional side elevational view of the closed and interconnected container system.
Figure 2A:
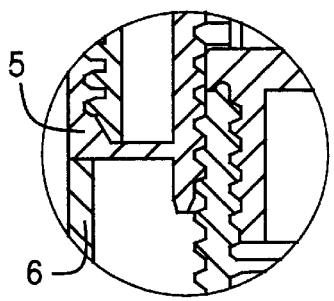
FIG. 2A is an enlarged detailed view of the area 2A of FIG. 2.
Figure 3:
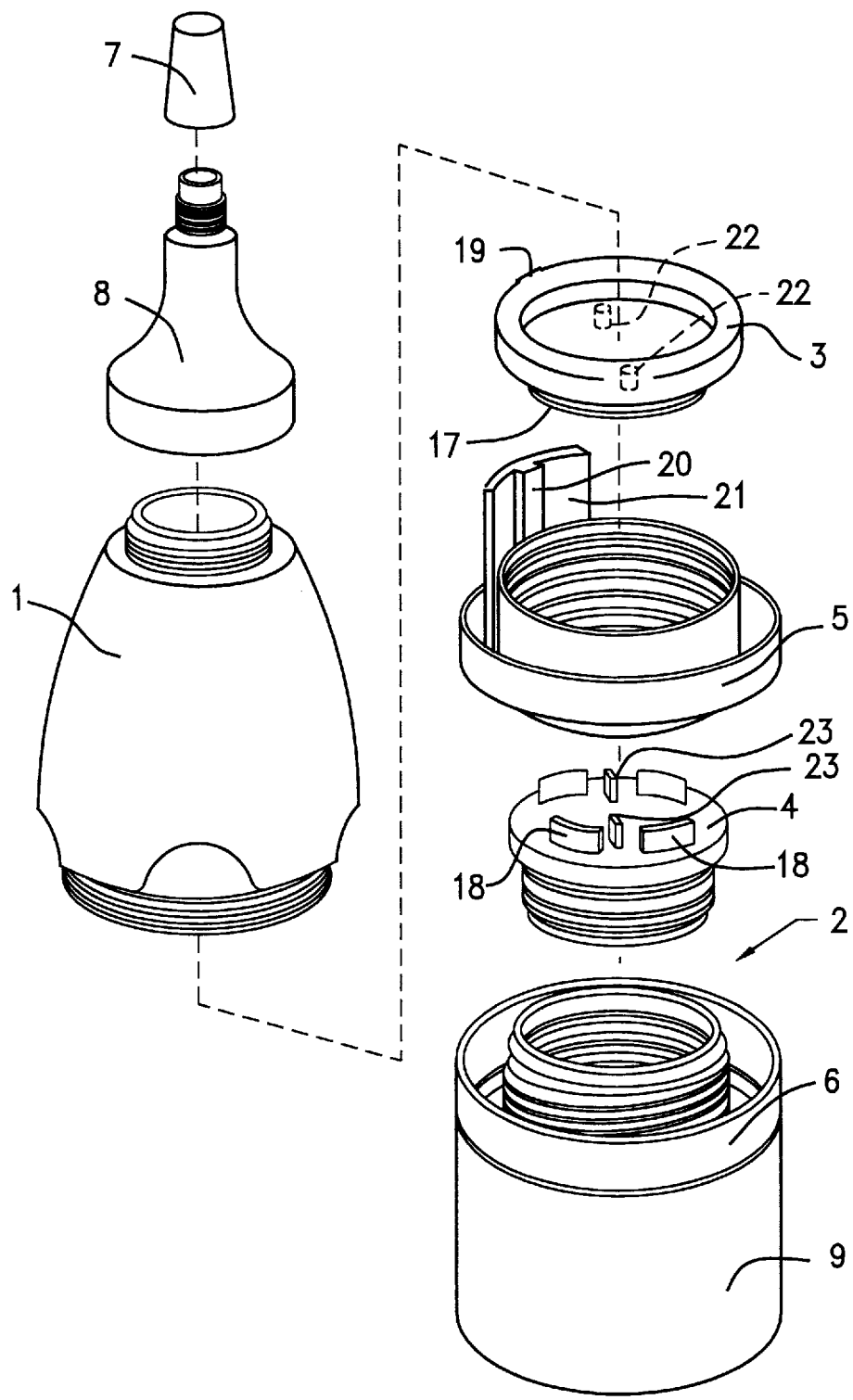
FIG. 3 is a perspective exploded assembly view of the container system broken down into its individual components.
Figure 4:
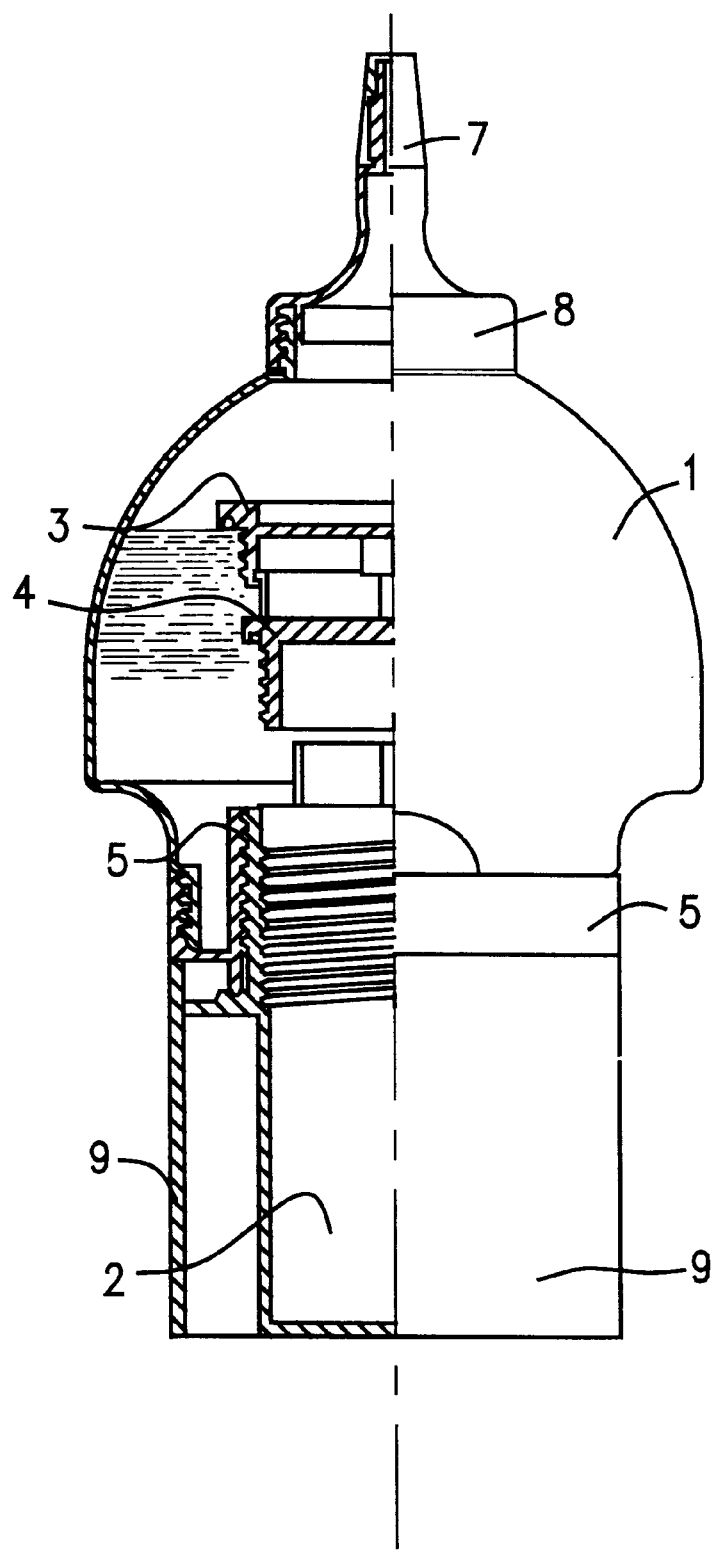
FIG. 4 is a partial sectional and front elevational view through the container system in the activated

FIG. 2 clearly shows how the parts used to close and connect the two containers 1,2 are connected to one another when the container system is closed and connected, but not yet activated. The design of the individual components, especially the locking mechanism, is graphically illustrated by the perspective view in FIG. 3. FIG. 4 shows how the system looks after activation.

The illustrated embodiment is shown complete with screw connections for closing and connecting the parts so that the container system as a whole, except for the distance sleeve 6, can be re-used. For the purposes of re-use, the distance sleeve 6 must be separately welded on or replaced by a new lower container 2 with an integrally moulded distance sleeve 6. Generally, however, a distance element can also be clamped on so that the container system as a whole can be re-used.

The screwthreads and other connecting and locking elements which co-operate to close and connect the containers are listed in the following. Formed on the upper container 1 is an external screwthread 10 which fits into the outer internal screwthread 12 of the intermediate closure 5. The external screwthread 11 of the upper closure 3 fits into the inner internal screwthread 13 of the intermediate closure 5. The combination of the intermediate closure 5 and the upper closure 3 screwed into it forms the closure of the upper container 1.

A sleeve 25 with a screwthread both on its inner surface and on its outer surface is present in the upper part of the lower container 2. The external screwthread 15 of the lower container 2 fits into the internal screwthread 13 of the intermediate container. All the screwthreads mentioned thus far turn in the same direction; in the illustrated embodiment, they are all right-hand threads. The two screwthreads which fit into one another, as listed hereinafter, turn in the opposite direction; in the illustrated embodiment, they are left-hand threads. The screwthread in question is the internal screwthread 16 of the lower container into which fits the external screwthread 14 of the lower closure.

When the two containers 1 and 2 are full, they are initially closed. In the case of the lower container 2, this is done by screwing in the lower closure 4. The upper container can be alternatively closed. The lower part of the upper container is first closed by the combination of the upper closure 3 and the intermediate closure 5, and the container 1 closed at one end is filled through the upper opening. The upper opening of the pouring spout 8 is then closed with the closure cap 7. However, these steps can also be carried out in reverse order. If the individually closed containers 1 and 2 are now connected by screwing the lower container 2 with its external screwthread 15 into the internal screwthread 13 of the intermediate closure. The sleeve segments which are formed on the outer closing surface of the lower closure 4 and which are provided at their upper edge with a bead 18 are also moved upwards. As shown in FIG. 2B, outwardly projecting bead 18 fits together with the inwardly projecting bead 17 on the upper closure 3 so that the sleeve segments with the bead 18 bend back slightly and move into the recess formed above the bead 17 until they come into contact at their upper edge with the closure cover of the upper closure 3. The two closures thus click into one another and are locked vertically relative to one another.

In addition, a stop 23 is formed on the lower closure 4, lying on the same peripheral line as a cam 22 disposed on the base of the upper closure 3. In addition, a projection 19 is formed peripherally on the upper closure 3 and bears against the flange 20 formed in the sleeve section 21 of the intermediate closure 5. In its closed and interconnected form, the container system assumes the appearance shown in FIG. 2.

To activate the container system, the distance sleeve 6 is first removed by means of a tear-off strip (not shown). The lower container 2 can thus move closer to the upper container 1. If, now, the lower container 2 is turned clockwise relative to the upper container 1, the lower closure 4 turns with the lower container 2. The stop 23 engages the cam 22 so that the upper closure 3 also turns. The nose-like projection 19 moves along its peripheral path until it comes into contact with the flange 20 of the sleeve section 21. The projection 19/flange 20 system could be replaced by a locking mechanism with a projection 19 which engages in a groove 20. This is made possible by the fact that the sleeve section 21 is flexible and is bent back by the projection 19. When the projection 19 engages in the groove 20, the sleeve section 21 bends forward again and holds the projection 19 fast so that it cannot move sideways.

The path along which the projection 19 moves must of course be smaller than one complete 360° turn. In the illustrated embodiment, it is 315°. 315°—corresponding to ⅞ths of a turn—is also the closure path of the external screwthread 11 in the internal screwthread 13 so that, when the projection 19 contacts the flange 20, the upper closure 3 is simultaneously released from the intermediate closure 5.

If the lower container 2 is turned further clockwise, the lower closure 4 is unable to turn with it because, through the stop 23, the lower closure 4 comes up against the cam 22 and, through the connection with the upper closure 3, is prevented from turning any further by the contact of the projection 19 with the flange 20. As a result, further clockwise turning of the lower container 2 unscrews the left-hand screwthread 14,16 and hence the lower closure 4 which can only move vertically together with the upper closure 3 with which it is firmly engaged through the beads 17,18. In the embodiment illustrated in FIGS. 1 to 4, the lower closure 4 is unscrewed from the lower container 2 after two clockwise turns and is able to enter the interior of the upper container 1 together with the clicked-on upper closure 3. The two volumes of the upper container 1 and lower container 2 are thus connected. The products accommodated in the containers 1,2 can then be combined and mixed and dispensed as a mixture after unscrewing of the closure cap 7.

Figure 5A:
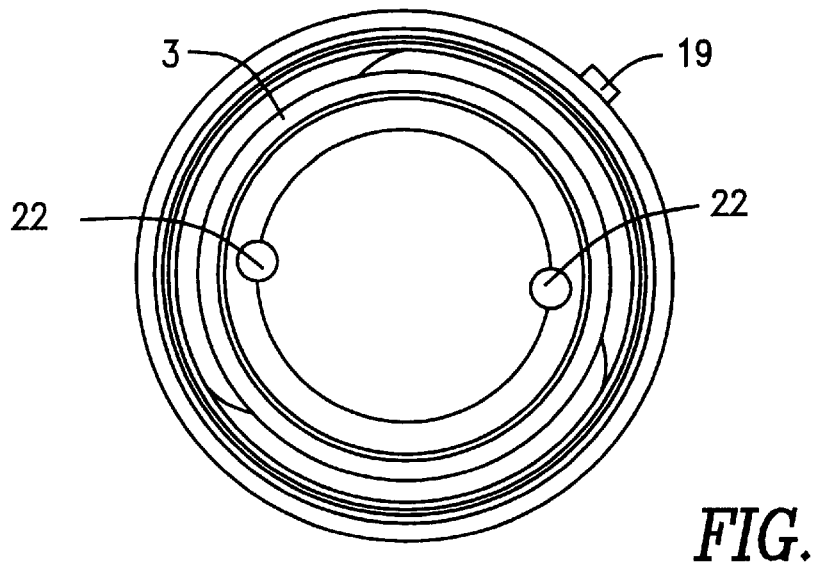
FIG. 5a shows a bottom view of an upper closure for one embodiment of the invention.
Figure 5B:
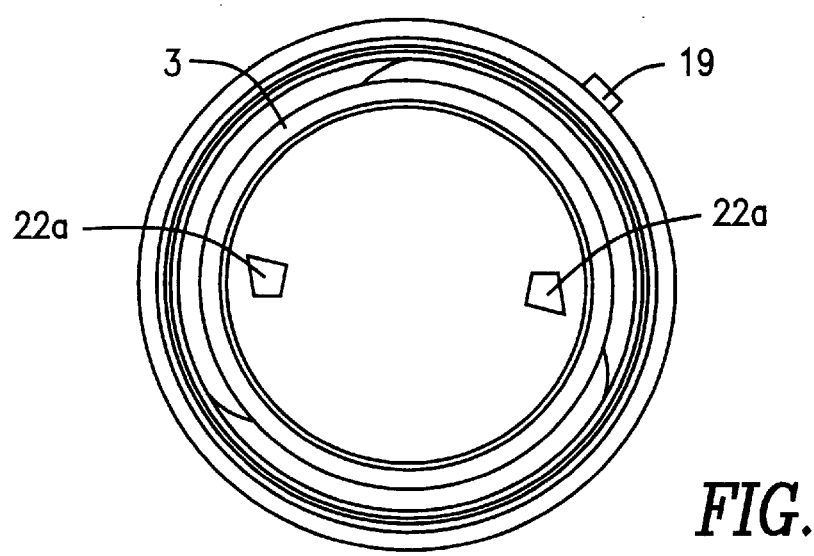
FIG. 5b is a bottom view of an upper closure for another embodiment of the invention.
Figure 6:
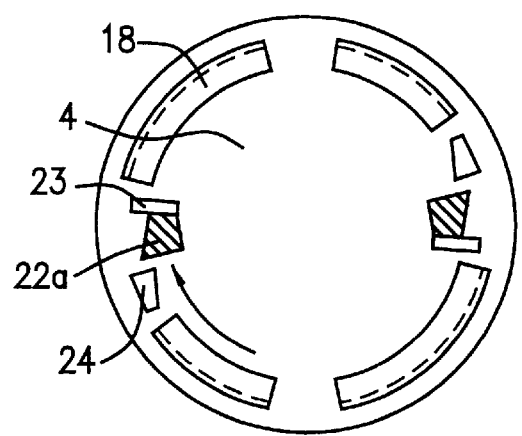
FIG. 6 is a plan view of another embodiment of an upper closure for the invention. position.

FIG. 5b shows a modification with reference to another embodiment. Here, the shape of the cam on the upper closure 3 has been changed from a round cross-section 22, as shown in FIG. 5a, to a quasi-rectangular cross-section 22a with a tip which, in the plan view of FIG. 5b, projects to the top right. In FIG. 6, which is a plan view of another embodiment of the upper closure 3, the cam 22a is shown hatched and turned through 180° in order to illustrate how it co-operates with the stop 23 and an additional cam 24 of the lower closure 4. To activate the container system in this embodiment, the lower container 2 and lower closure 4 are turned clockwise and the stop 23 strikes the cam 22a which, on further rotation, clicks into the gap between the stop 23 and the cam 24. Accordingly, the system can only be turned in one direction.

What is claimed is:

1. A container system for accommodating at least two substances held separately in closable containers, comprising two containers, including axially aligned upper, intermediate, and lower closures therebetween, respectively, designed for connection to one another in the order given, and after connection, being designed to be opened by movement relative to one another in such a way that the container volumes are connected together, wherein said closures are screw closures, and one of said containers is designed to be closed by a combination of said upper closure and said intermediate closure.

2. A container system as claimed in claim 1, wherein the combination of said upper closure and the intermediate closure and the one container closable by that combination include screwthreads turning in one direction, whereas said lower closure closing the other container and the other container itself comprise screwthreads turning in the opposite direction for the purpose of closure.

3. A container system as claimed in claim 2, wherein both containers have external screwthreads turning in one direction and are designed to be screwed into the intermediate closure from both sides.

4. A container system as claimed in claim 3, wherein when the two containers are connected, said upper and lower screw closures are designed to lock axially against one another with their sides remote from the container and to be held by a cam operated stop system so that they turn in one direction only and in that, after its release from the intermediate closure, the screw closure of said upper closure turning in the same direction as the intermediate closure is prevented from turning any further relative to the intermediate closure in that it is only able to move axially.

5. A container system as claimed in claim 4, wherein the screw closure of said upper closure turning in the same direction as the intermediate closure is prevented from turning any further by contact of a peripheral projection of said upper closure with an axially extending flange in a sleeve section of the intermediate closure.

6. A container system as claimed in claim 5, wherein as the screw closure of the lower closure approaches the upper closure, a cam of the upper closure is designed to click into a gap between a stop and a cam of the lower closure for the purpose of locking.

7. A container system as claimed in claim 5, further including a removable distance sleeve disposed between connected and closed said two containers so that the two containers cannot be moved towards one another.

8. A container system as claimed in claim 5, wherein at least one container includes screw closures having opposing ends turning in opposite directions.

9. A container system as claimed in claim 4, wherein as the screw closure of the lower closure approaches the upper closure, a cam of the upper closure is designed to click into a gap between a stop and a cam of the lower closure for the purpose of locking.

10. A container system as claimed in claim 4, further including a removable distance sleeve disposed between connected and closed said two containers so that the two containers cannot be moved towards one another.

11. A container system as claimed in claim 4, wherein at least one container includes screw closures having opposing ends turning in opposite directions.

12. A container system as claimed in claim 3, wherein as the screw closure of the lower closure approaches the upper closure, a cam of the upper closure is designed to click into a gap between a stop and a cam of the lower closure for the purpose of locking.

13. A container system as claimed in claim 3, further including a removable distance sleeve disposed between connected and closed said two containers so that the two containers cannot be moved towards one another.

14. A container system as claimed in claim 3, wherein at least one container includes screw closures having opposing ends turning in opposite directions.

15. A container system as claimed in claim 2, wherein as the screw closure of the lower closure approaches the upper closure, a cam of the upper closure is designed to click into a gap between a stop and a cam of the lower closure for the purpose of locking.

16. A container system as claimed in claim 2, further including a removable distance sleeve disposed between connected and closed said two containers so that the two containers cannot be moved towards one another.

17. A container system as claimed in claim 2, wherein both containers have external screwthreads turning in one direction and are designed to be screwed into the intermediate closure from both sides.

18. A container system as claimed in claim 2, wherein at least one container includes screw closures turning in opposite directions at both ends and is connected to said another container via said intermediate closure with respective closures facing one another.

19. A container system as claimed in claim 1, wherein as the screw closure of the lower closure approaches the upper closure, a cam of the upper closure is designed to click into a gap between a stop and a cam of the lower closure for the purpose of locking.

20. A container system as claimed in claim 19, further including a removable distance sleeve disposed between connected and closed said two containers so that the two containers cannot be moved towards one another.

21. A container system as claimed in claim 19, wherein at least one container includes screw closures having opposing ends turning in opposite directions.

22. A container system as claimed in claim 1, further including a removable distance sleeve disposed between connected and closed said two containers so that the two containers cannot be moved towards one another.

23. A container system as claimed in claim 22, wherein at least one container includes screw closures having opposing ends turning in opposite directions.

24. A container system as claimed in claim 22, wherein the diameter of the distance sleeve is equal to the largest diameter of the intermediate closure and the two containers at respective ends facing one another.

25. A container system as claimed in claim 24, wherein at least one container includes screw closures having opposing ends turning in opposite directions.

26. A container system as claimed in claim 1, wherein one container includes screw closures having opposing ends turning in opposite directions.

27. A method for combining at least two substances held separately in predetermined quantities in upper and lower closed containers, respectively, of a container system, said upper and lower containers being connected via axially aligned upper, intermediate, and lower closures, respectively, being connected in the order given to one another, and the connected upper and lower containers being opened by movement relative to one another so that the at least two substances can be combined, wherein the method comprises the steps of:

including screw connections between said upper, intermediate, and lower closures, and said two containers; and selectively turning said screw connections in opposite directions for opening and closing the volumes of said containers to one another, respectively.

28. A container system having a plurality of containers for holding a plurality of substances, respectively, said system comprising:

means for connecting said plurality of containers successively together;

said connecting means including a screw closure between said plurality of containers, for permitting said plurality of containers to have their volumes and respective substances closed off from one another until the substances are to be combined, whereafter said screw closure means provides for said plurality of containers to be turned in opposite directions for operating said screw closure to open, thereby permitting the substances to be combined and dispensed from a bottom or top one of said plurality of containers.

29. The container system of claim 28, wherein said screw closure includes:

respective upper, intermediate, and lower screw closures between and connecting said plurality of containers;

said plurality of containers having an upper container and a lower container designed to screw into said intermediate screw closure on opposite ends thereof;

said upper screw closure being designed to screw into an end of said intermediate screw closure end proximate said upper container; and each lower screw closure being designed to screw into said intermediate screw closure end proximate said lower container.

* * * * *